United States Patent [19]
Fallandy et al.

[11] Patent Number: 5,628,105
[45] Date of Patent: May 13, 1997

[54] IMPACT TOOL WITH MULTI-WIRE CUTTING HEAD

[75] Inventors: Michael M. Fallandy, Ventura; Edward J. Zoiss, Moorpark, both of Calif.

[73] Assignee: Harris Corporation, Melbourne, Fla.

[21] Appl. No.: 411,575

[22] Filed: Mar. 27, 1995

[51] Int. Cl.[6] .................................................. H01R 43/00
[52] U.S. Cl. ........................ 29/566.4; 29/566.3; 29/751; 30/242
[58] Field of Search .................. 29/566.3, 566.4, 29/751; 30/231, 242, 272.1, 194; 83/913, 909

[56] References Cited

U.S. PATENT DOCUMENTS

| | | | |
|---|---|---|---|
| 3,029,512 | 4/1962 | Saxton | 30/367 |
| 3,898,724 | 8/1975 | Conorich | 29/566.4 |
| 4,696,090 | 9/1987 | Gregson et al. | 29/566.4 |
| 5,175,921 | 1/1993 | Krietzman | 29/566.4 |

*Primary Examiner*—M. Rachuba
*Assistant Examiner*—Christopher Kirkman
*Attorney, Agent, or Firm*—Charles E. Wands

[57] ABSTRACT

An impact tool for seating and cutting plural wires in a telephone wire termination block includes a movable cutter containing guide and shear elements having a spacial periodicity which differs slightly from that of terminals of the termination block. A force release mechanism in the tool handle includes a plunger translatable along the axis of the handle that engages a shaft for a stationary cutting head. The plunger passes through a bore of hammer which has a transverse bore sized to receive plural balls that are urged against and retain the plunger with the hammer. A main spring within the handle urges the hammer axially toward the shaft. The hammer passes through a ball-collar, which is axially translatable to remove retention between the hammer and the plunger, allowing the plunger to pass through the hammer bore, so that the hammer is rapidly axially translated by a main spring and strikes the plunger, imparting an impact force to the shaft. A force translation lever then linearly translates a movable cutter, which cuts the wires in rapid sequence.

53 Claims, 6 Drawing Sheets

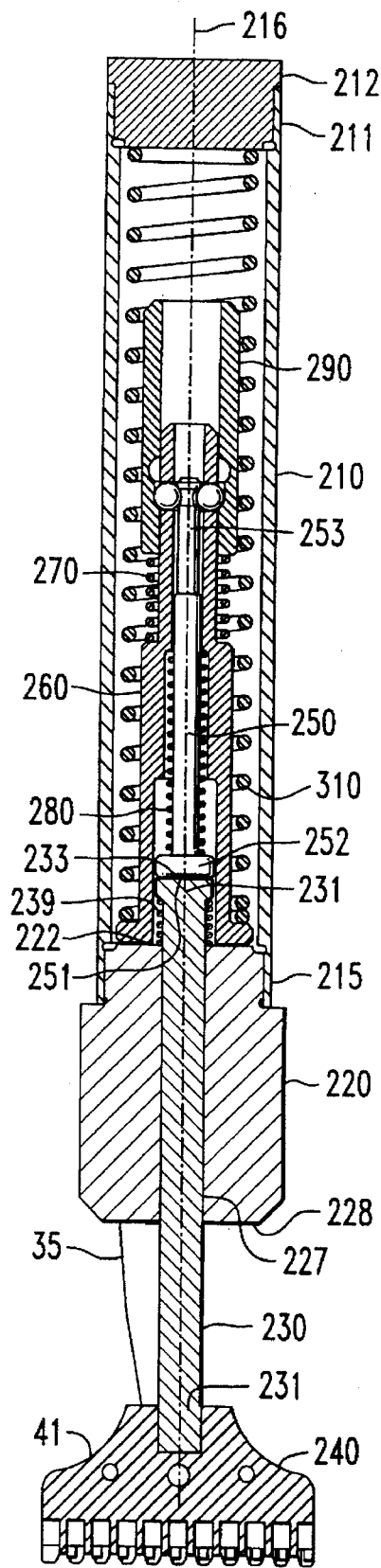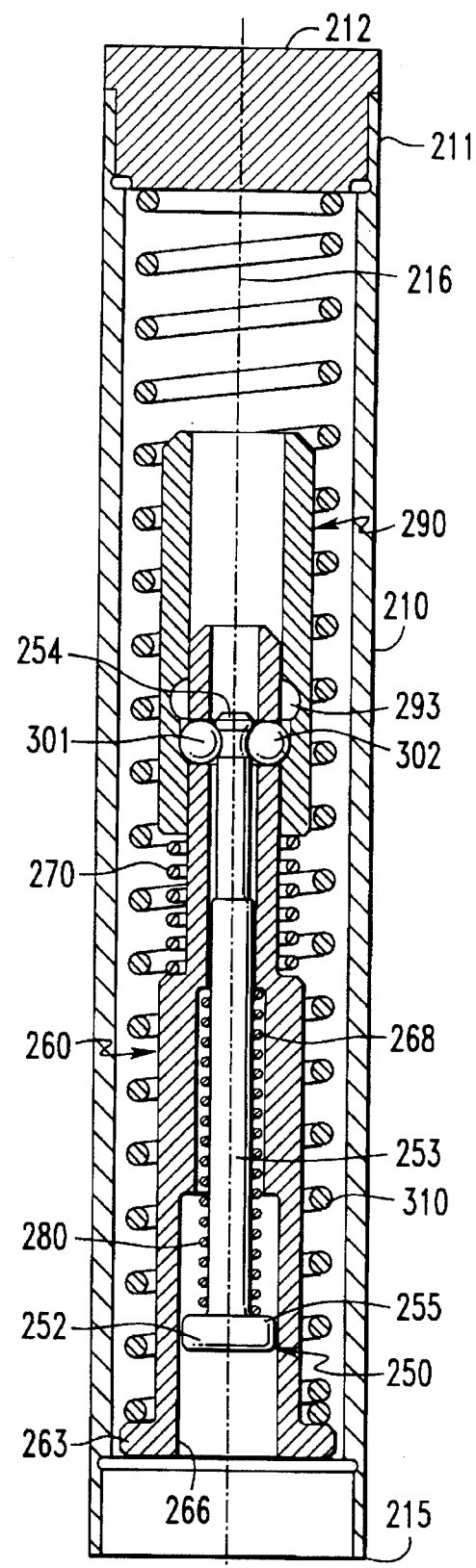
*FIG. 27*  *FIG. 28*

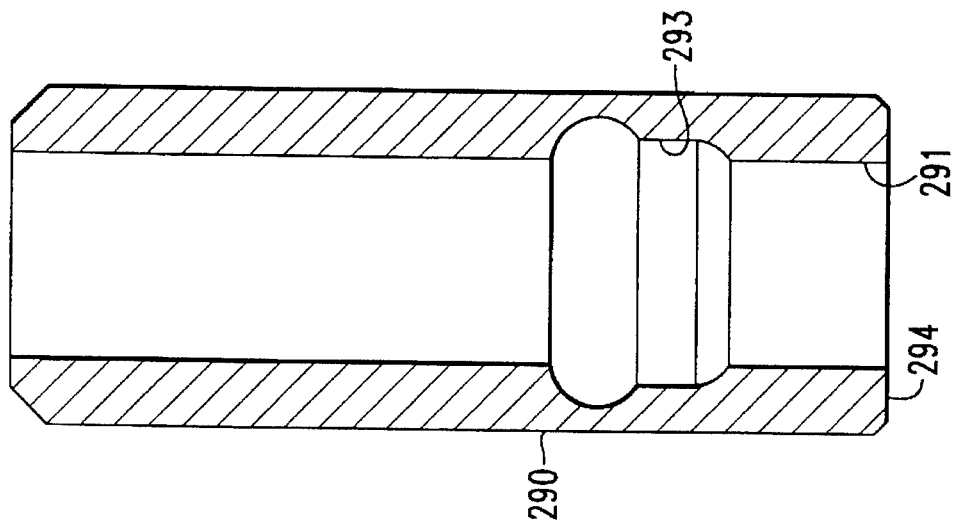
FIG. 32
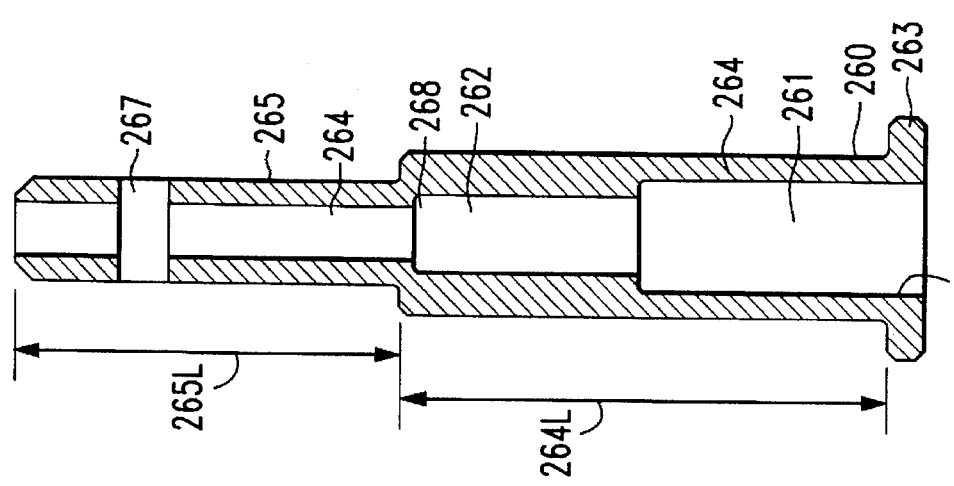
FIG. 31
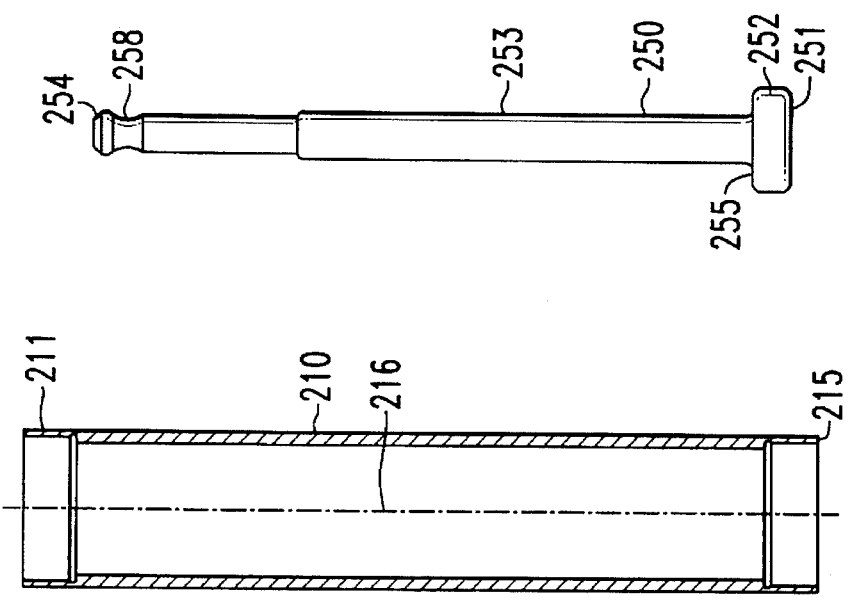
FIG. 30
FIG. 29

IMPACT TOOL WITH MULTI-WIRE CUTTING HEAD

FIELD OF THE INVENTION

The present invention relates in general to impact tools of the type employed in the telephone industry for inserting the free ends of multiple wires into resilient terminals mounted to connector blocks of telephone office mainframes, and is particularly directed to an impact tool having an enhanced force release mechanism and a leveraged cutting head, which work together to seat and cut a plurality of wires in the course of a single insertion stroke applied to the impact tool.

BACKGROUND OF THE INVENTION

The telephone industry currently offers its craftspersons a variety of impact tool configurations for cutting and seating individual telephone wires in terminal blocks that are mounted to telephone office mainframe units. For an illustration of documentation describing a variety of non-limiting examples of such impact tools, attention may be directed to U.S. Pat. Nos. 5,195,230, 4,696,090, 4,567,639, and 4,241,496 and the patents cited therein.

Typically, an impact tool has a handle from which a wire-gripping and cutting head extends. The interior of the handle may contain an axially translatable hammer element, which is biased by a compression spring to strike the cutting head, and thereby cut one end of a wire that has been seized or inserted into a wire capture and gripping end region of the cutting head. As the craftsperson grips the handle and pushes it against a wire in a terminal receptacle, a hammer release element within the handle is moved into alignment with the hammer travel path, so that the forced stored in a main spring is released, causing the hammer to rapidly impact the cutting head, so that the end of the wire is cut and becomes seated in the terminal.

One of the principal shortcomings of the type of impact tools currently in use is the need for the craftsperson to push the handle with more force than is required to compress the main spring. This need for additional force is due to the fact that the hammer release element employs a (wedge-configured) push-plate that must be moved transverse to the hammer's translation axis, in order to achieve alignment with an insertion slot, and allow the hammer to be released. Since the push-plate is moved by the application of force along the handle axis, the total amount of axially imparted force required to operate the tool is that required to both compress the main spring and move the push-plate. As a consequence, its use is time-consuming and labor-intensive, thereby increasing the cost of installation of telephone equipment.

It would be desirable to reduce the amount of effort required to operate the tool, and thereby lessen the labor burden on the craftsperson. In so doing it would also be desirable that the tool have the ability to seat and cut multiple wires at substantially the same time.

SUMMARY OF THE INVENTION

In accordance with the present invention, the above described limitations of prior art impact tools are obviated by a new and improved impact tool configuration that is designed to seat and cut a plurality of wires in a telephone wire termination block, without requiring the application of an extraordinary amount of force by the craftsperson to operate the tool. To meet this objective, the impact tool of the invention employs a leveraged, sequential multiple wire cutting head, having a moveable cutter that contains a plurality of wire shear and guide regions, configured to be placed against the wire-receiving terminals of a terminal block.

The shear and guide regions of the movable cutter are spaced apart from one another by respective separations that differ slightly from those between adjacent terminals of the terminal block, so that, as the movable cutter of the cutting head is translated against the wires to be cut and seated, its shear elements do not engage each wire at the same time. Instead, the wires are engaged in rapid sequence, such that the cutting force of the tool effects a rapid, cascaded severing of a plurality of wires during a single impact stroke. The force application mechanism of the tool leverages the movable cutter so as to provide a mechanical advantage, which effectively reduces the input force required to cut plural wires to that required to sever and seat an individual wire. In addition, the force release mechanism within the tool handle is configured so that the force required to compress the main spring is also effective to release the hammer, so as to reduce the work burden on the operator.

To this end, a first embodiment of the leveraged sequential multiple wire cutting and seating impact tool according to the present invention comprises a generally hollow handle which is closed by means of an end cap having an external cam surface portion and an internal axial bore. The axial bore is sized to receive and accommodate axial translation of a generally cylindrical shaft element to which a leveraged, sequential multiple wire-cutting and seating head is mounted. The axially translatable cylindrical shaft element has a generally flat end face which is sized to be engaged by the lower end face of a generally cylindrical T-head portion of a moveable plunger. The plunger has a longitudinal rod that extends from its cylindrical T-head portion and passes through an axial bore of a hammer and terminates at a tapered end portion.

The hammer has a first body portion that extends a first length from a lower end face to a second body portion, which has a second length and a smaller outer diameter than the first body portion. This smaller outer diameter of the second body portion of the hammer provides a surrounding annular region, that is bounded by the interior sidewall of the handle and accommodates a first, ball collar-return, compression spring.

Within the first body portion of the hammer, its axial bore has a diameter slightly greater than the outer diameter of the generally cylindrical T-head portion of the plunger, so that the plunger may axially translate therein. A second portion of the hammer's axial bore is sized to accommodate a second, plunger-return, compression spring that surrounds the plunger rod. Extending from the hammer's second bore portion is a third bore portion which has a further reduced diameter, which causes the plunger return compression spring to be confined between the interior end of the second bore portion and an interior face of the T-head portion of the plunger.

The second bodyportion of the hammer further includes a transverse bore which is sized to receive a pair of steel balls. When the steel balls are captured in the transverse bore, there is sufficient space between them to accommodate and be urged against the tapered end of the plunger rod. The second hammer body portion is sized to pass into a first, lower end of a generally cylindrical axial bore of a generally tubular ball-collar, which is axially translatable within the handle.

A main spring is captured between an upper end face of the hammer and an interior surface of an upper base end of the handle, and is sized to fit within the axial bore of the ball-collar. The diameter of the ball-collar bore is increased at an annular region displaced from the ball-collar's lower end and forms an interior annular notch or groove that is sized to accommodate the entry and capture each of the steel balls in the course of relative axial displacement between the hammer and the ball-collar. Namely, the force required to compress the main spring by pushing down on the handle also causes translation of the hammer relative to the ball collar, so as to bring the balls within the hammer's transverse bore into eventual alignment with the interior groove in the ball collar at a point in their relative axial travel where the mainspring is fully compressed, whereby the balls move out of the way of the plunger and allow the hammer to release.

The sequential multiple wire-cutting and seating head has a main body portion that is mounted to a lower end of the cylindrical shaft element, such that axial displacement of the shaft element within the axial bore of the end cap will cause axial displacement of the main body portion of the cutting head relative to the end cap. The cutting head has a lever arm, which rotates about a pin affixed to a main body portion, and slides along the cam surface portion of the cap member. A lower end portion of the lever arm engages a movable cutter having a plurality of wire cutting blades, and supported by the main body portion of the cutting head for translation in a direction transverse to the axis of the handle. The transverse translation of the blades of the cutter is effected by the rotation of the lever arm.

The dimensions of the lever arm and the angle of incline of the cam surface of the end cap provide a mechanical advantage in the course of translating the insertion force to the transverse direction. The separations between successively adjacent cutter head blades are slightly greater than spacings between adjacent terminals of a terminal block, so that adjacent wires will be effectively engaged in rapid sequence when the cutting head is translated against the wires by the rotation of the lever arm. As a result of this combination of the mechanical advantage and the slightly increased spacings between the blades of the cutting head relative to those of the block receptacle terminals into which the wires are inserted, the force that would be required to be imparted to the cutting head to completely shear a single wire is effective to sequentially cut through and seat multiple wires.

In operation, the impact tool is initially positioned so that the cutting head is urged against the wires to be inserted into plural terminals of the terminal block, with individual wires being received in respective spaces between successive blades of the cutting head. In this position of the tool, the lower end face of the hammer is urged against the upper end face of the end cap by the main compression spring. In addition, the lower end face of the T-head portion of the plunger is urged by the plunger return spring against the upper generally flat end face of the shaft to which the cutting head is attached mounted. In this configuration, the ball-collar is separated from the hammer by the ball-collar return spring.

To seat and cut the wires, the craftsperson pushes downwardly on the handle, which initiates rotation of the lever arm about its fulcrum pin, so that an upper end of the lever arm begins to travel along the cam surface portion of the handle end cap. As the lever arm rotates, the effective axial separation between its axis of rotation and the lower end face of the end cap decreases, causing the handle to begin travelling downwardly around the axial bore in the end cap. This rotation of the lever arm causes the movable cutter to be translated against the wires in the terminal block, so that the blade elements of the movable cutter sequentially come into contact with and effect the shearing of successively adjacent ones of the wires.

Within the interior bore of the handle, since the lower end face of the plunger is urged against the upper generally flat end face of the shaft by the plunger return spring, the downwardly moving handle axially translates the end cap farther away from the plunger. With the tapered end of the plunger rod being urged against each of the steel balls that are captured in the transverse bore of the hammer, the downward force on the handle causes the handle to move downwardly past the hammer, so that the distance between the hammer and the base end of the handle decreases, thereby decreasing the separation between each of the hammer and the ball-collar and the base end of the handle, compressing the main spring.

As the lever arm continues to rotate, the ball-collar eventually comes into contact with the interior base end of the handle and, as the lever arm continues to rotate, there is associated translation of the cutter, so that the cutter head blades continue to cut through and completely sever successively engaged wires. As the craftsperson continues to apply a downward force on the handle, separation between base end of the handle and the hammer continues to decrease, causing further compression of the main spring, and compression of the ball-collar return spring. This relative axial movement between the hammer and the ball-collar eventually brings the transverse bore in which the steel balls are captured axially adjacent to the annular interior groove of the ball-collar.

At the point where the main spring becomes fully compressed, the tapered end of the plunger rod pushes each of the steel balls into the groove in the ball-collar, so as to allow the plunger rod to pass between the two balls. As the steel balls are received in the groove in the ball-collar they mechanically link the hammer and the ball-collar together and release their retention of the hammer with the plunger. Since the steel balls are now out of the way of the plunger, the compressive force stored in the main spring is released against hammer, whereby the hammer and the cylindrical T-head portion of plunger are rapidly propelled toward one another, and the hammer strikes the T-head portion of the plunger. The impacting force between the hammer and the plunger is transferred to the axial shaft to which the cutting head is affixed, causing a corresponding final impact-based rotation of the lever, and a rapid forceful transverse movement of the movable cutter's blades through the remaining ones of the wires, thereby completing the wire severing/seating operation of the tool.

Since the ball-collar is linked by the steel balls to the hammer, the ball-collar moves downwardly in concert with the hammer, thereby compressing the ball-collar return spring. In addition, the plunger return spring is compressed. After the hammer strikes the T-head portion of the plunger, the craftsperson releases pressure applied to the handle, allowing the restoring force energy stored each of the ball-collar return spring and the plunger return spring to be released, thereby causing the hammer and the ball-collar to move back toward the base end of the handle, and causing the lever arm to rotate toward its original position, as the plunger continues to impart a downward force against the shaft.

As the ball-collar travels past the plunger rod, an edge of the groove in the ball-collar pushes against the steel balls, urging them towards each other. Eventually, relative axial movement between the hammer and the plunger brings the tapered end of the plunger rod past the transverse bore, and again brings the groove of the ball-collar alongside the transverse bore, whereupon the steel balls enter the transverse bore and are thereby again captured by the hammer. The plunger and the hammer continue to move past one another until the tool components have returned to their original positions, with the lower end face of the hammer still urged against the upper end face of the end cap by the main spring, and the lower end face of the generally cylindrical T-head portion of the plunger urged against the upper generally flat end face of the shaft by the plunger return spring. The cutting head shaft is now once again fully extended, with the cutting head lever arm having been rotated back to its original position.

The second embodiment of the impact tool according to the present invention differs from the first embodiment in that the main spring extends the entire length of the handle bore, surrounding both the hammer and the ball-collar. This additional length of the main spring provides for an increased impact force. Like the first embodiment, the second embodiment of the tool includes a generally cylindrically configured tubular handle, having an upper end closed by a base cap, and a lower end to which a end cap is affixed. The end cap has an upper end face and a cam surface which extends from a first end and terminates at cylindrical sidewall region of the end cap adjacent to the lower end of the tubular handle. The end cap has an axial bore, which is coaxial with the a longitudinal axis of the tubular handle, and is sized to receive and accommodate axial translation of a cylindrical shaft to which the cutting head is mounted.

The cylindrical shaft has an upper, T-shape end portion having a generally flat end face, which is sized to be engaged by a lower end face of a generally cylindrical T-head portion of a plunger. A shaft return spring is captured on the shaft between its end portion and the upper end face of the end cap. Extending from the cylindrical T-head portion of the plunger is a cylindrical plunger rod, which passes through a generally cylindrical axial bore of a hammer and terminates at a tapered end portion. A plunger return spring surrounds the plunger rod between the T-head portion of the plunger and the interior end of first portion of the axial bore through the hammer.

The hammer comprises a generally cylindrically configured hollow body, having an annular lip portion from which extends a first hammer body portion. The hammer is axially translatable within the handle and is surrounded by an increased length main spring that is confined between the upper end of the handle tube and the annular lip portion of the hammer. A first hammer body portion extends a first length from the annular lip portion to a second hammer body portion, which has a second length and a smaller outer diameter than the first hammer body-portion. The smaller outer diameter of the second hammer body portion accommodates a surrounding ball collar-return, compression spring and a generally cylindrical ball-collar.

Within the first hammer body portion, a first bore region has a diameter slightly greater than the outer diameter of the generally cylindrical T-head portion of the plunger, so that the plunger may axially translate within the first bore region of the hammer. Extending from the first hammer bore region is a second hammer bore region in which plunger return spring is confined.

The second hammer body portion includes a transverse bore, which is sized to accommodate a pair of steel balls, such that the steel balls are captured between a circular groove in the plunger shaft and a circular detent in the ball-collar. The ball-collar has an outer diameter that is less than that of the interior diameter of the tubular handle, so as to allow the ball-collar to fit within the longer main spring. The interior diameter of the ball-collar is increased over a tapered annular region, which forms a curvilinearly tapered groove or notch, axially displaced from the ball-collar's lower end and is sized to accommodate the entry and capture of the steel balls during relative axial displacement between the hammer and the ball-collar, similar to first embodiment, so as to allow the hammer to rapidly move past the plunger shaft.

The leveraged sequential multiple wire-cutting and seating head is the same as that of the first embodiment, with the main body portion thereof mounted to a lower end of the cylindrical shaft element, so that axial displacement of the shaft element within the axial bore of the end cap will cause axial displacement of the main body portion of the cutting head relative to the end cap, and thereby rotation of the lever arm, so that the impacting force between the hammer and the plunger is transferred to the axial shaft to which the cutting head is affixed, causing a corresponding rapid impact-based rotation of the lever, and a dynamic transverse movement of the movable cutter of the cutting head blades through the wires, thereby completing the sequential multiple wire severing/seating operation of the impact tool.

BRIEF DESCRIPTION OF THE DRAWINGS

FIG. 27 is a diagrammatic assembly drawing of a second embodiment of a leveraged, sequential multiple wire impact tool according to the present invention;

FIG. 28 is a diagrammatic assembly drawing of the components housed in the handle portion of the impact tool shown in FIG. 27;

FIG. 29 details the tubular handle portion of the impact tool shown in FIG. 27;

FIG. 30 details the plunger of the impact tool shown in FIG. 27;

FIG. 31 details the hammer of the impact tool shown in FIG. 27; and

FIG. 32 details the ball-collar of the impact tool shown in FIG. 27.

DETAILED DESCRIPTION

Figure 1:
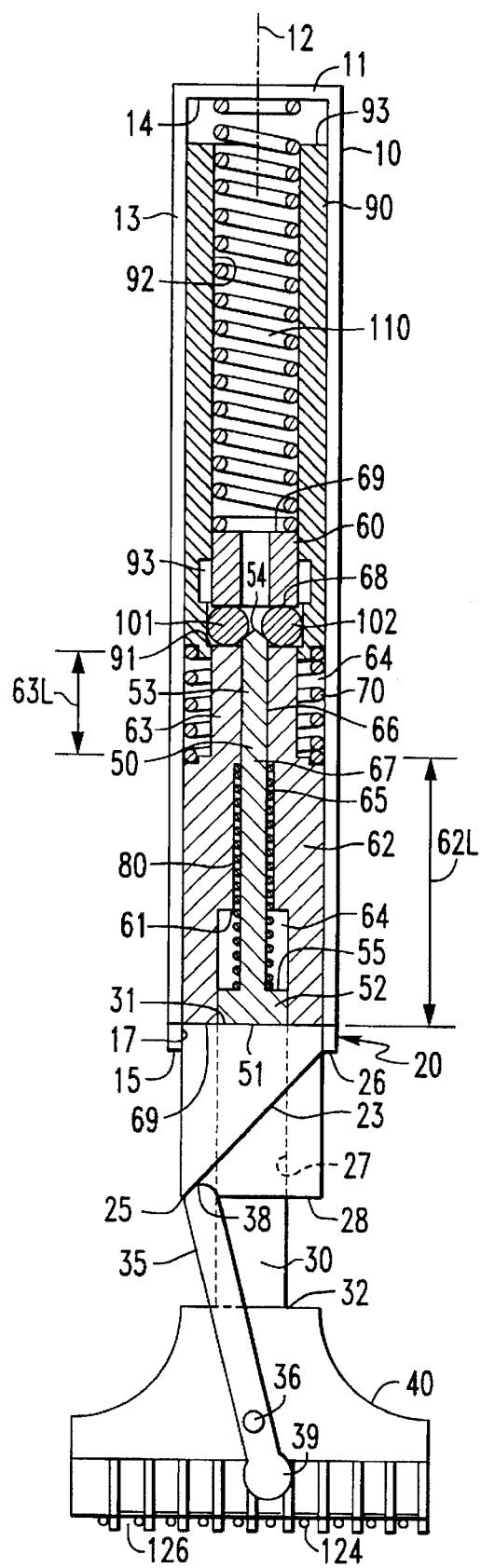
FIG. 1 is a diagrammatic assembly drawing of a first embodiment of a leveraged, sequential multiple wire impact tool according to the present invention.
Figure 2:
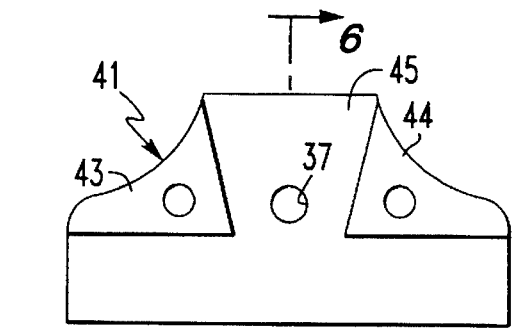
FIG. 2 shows a front side view of the main body or punch portion of the cutting head.
Figure 3:
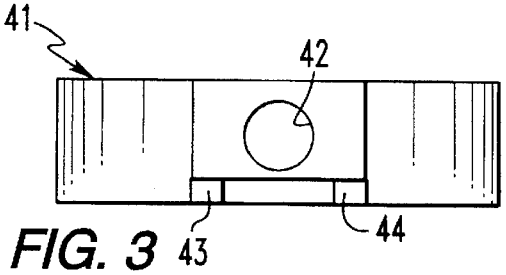
FIG. 3 shows a top view of main body portion of the cutting head.
Figure 4:
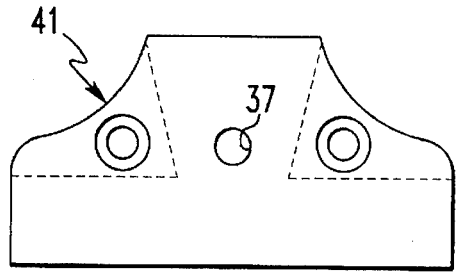
FIG. 4 shows a rear side view of the main body portion of the cutting head.
Figure 5:
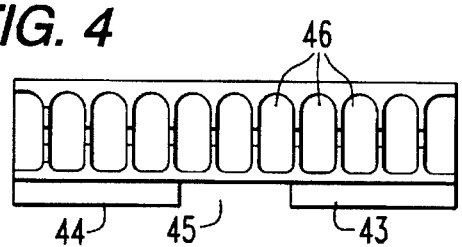
FIG. 5 shows a bottom view of the main body portion of the cutting head.
Figure 6:
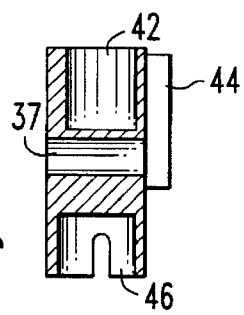
FIG. 6 shows a sectional view of the main body portion of the cutting head, taken along line 6—6 of FIG. 2.
Figure 7:
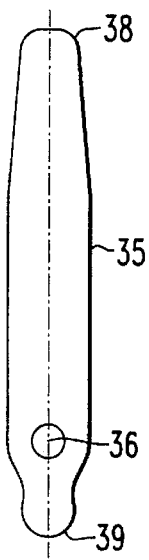
FIGS. 7 and 8 are respective front and side views of a lever arm.
Figure 8:
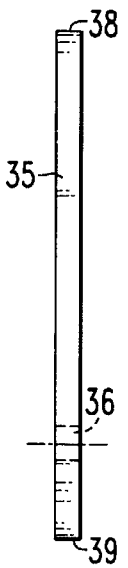

FIG. 1 diagrammatically illustrates a first embodiment of a fully assembled, leveraged, sequential multiple wire impact tool according to the present invention. Except for the cutting head, most of the components that are contained within a generally cylindrically configured or tubular handle portion 10 of the tool are cylindrically symmetric about a longitudinal axis 12 of the tool. Thus, the cross-sectional view of FIG. 1, which lies in a plane containing the longitudinal axis 12, fully illustrates such components. As shown therein, the generally cylindrically configured handle 10 has a first, closed base end 11 that is solid with a hollow tubular or cylindrical body 13, which is open at a second end 15 thereof. An interior wall portion 17 of cylindrical hollow body 13 adjacent to second end 15 may be threaded, so as to accommodate the external threads of a generally cylindrical end cap 20.

End cap 20 has an upper end face 22 and a generally linearly inclined cam or ramp surface portion 23, which extends from a first end 25 of end cap 20 and terminates at cylindrical sidewall region 26, adjacent to the second end 15 of cylindrical handle body 13. End cap 20 also has an axial bore 27, which is coaxial with the longitudinal axis 12 of tubular handle 10, and is sized to receive and accommodate axial translation of a cylindrical shaft 30, to a lower end 32 of which a cutting head 40 is mounted. In addition, end cap 20 has a lower end face 28 that is generally transverse to the longitudinal axis 12 of the tool.

Cylindrical shaft 30 has an upper, generally flat end face 33, which is sized to be engaged by the lower end face 51 of a generally cylindrical T-head portion 52 of a plunger 50. Extending from the cylindrical T-head portion 52 of a plunger 50 is a cylindrical shaft or rod 53, which passes through a generally cylindrical bore 61 of a hammer 60. Plunger rod terminates at a tapered end portion 54 thereof.

Hammer 60 is generally cylindrically configured and has an outer diameter that is slightly less than that of the interior diameter of hollow cylindrical handle body 13, so that the hammer 60 is axially translatable within the handle. The hammer has a first body portion 62 that extends a first length 62L from a lower end face 69 to a second body portion 63, which has a second length 63L and a smaller outer diameter than first body portion 62. This smaller outer diameter of the second body portion 63 of the hammer 60 provides a surrounding interior annular region 64, that is bounded by the interior cylindrical sidewall of the handle 13, and accommodates a first, ball collar-return, compression spring 70.

Within the first body portion 62 of the hammer, bore 61 has a first bore region 64, of a diameter slightly greater than the outer diameter of generally cylindrical T-head portion 52 of plunger 50, so that plunger 50 may axially translate within first bore region 64 of hammer 60. Extending from first bore region 64 is a second bore region 65, sized to accommodate a second, plunger-return, compression spring 80, that surrounds cylindrical shaft 53 of plunger 50. The second hammer bore region 65 extends to a third bore region 66 within the second hammer body portion 62. The diameter of the third bore region 66 in the hammer's second body portion 63 is smaller than that of the second bore region 65 in the hammer's first body portion 62, so that the second compression spring 80 is confined between the interior end 67 of the second bore region 65 and an interior face 55 of the generally cylindrical T-head portion 52 of plunger 50.

The second body portion 63 of hammer 60 further includes a transverse bore 68, which is sized to receive a pair of steel balls 101 and 102. When the steel balls 101 and 102 are captured in transverse bore 68, there is sufficient space between them to accommodate the tapered end portion 54 of the plunger shaft 53, such that the tapered end portion 54 of the plunger shaft 53 is urged against each of the steel balls, and the plunger and hammer are thereby mechanically linked or retained together. The second hammer body portion 63 is sized to pass into a first, lower end 91 of a generally cylindrical axial bore 92 of a generally tubular ball-collar 90. Axial bore 92 extends to a second, upper end 93 of ball-collar 90. Like hammer 60, ball-collar 90 is cylindrically configured and has an outer diameter that is slightly less than that of the interior diameter of the handle, so that the ball-collar 90 is axially translatable within the handle 10.

A main spring 110 is captured between an upper end face 69 of hammer 60 and an interior surface 14 of the base end 11 of the tubular handle, and is sized to fit within the axial bore 92 of ball-collar 90. The diameter of axial bore 92 is increased at an annular region 93, which forms a notch or groove in the ball collar that is axially displaced from the ball-collar's lower end 91, and is sized to accommodate the entry and capture therein of each of steel balls 101 and 102, in the course of relative axial displacement between hammer 60 and ball-collar 90, at the point where the main spring 110 becomes fully compressed, as will be described.

As shown diagrammatically in FIG. 1 and in component detail in FIGS. 2–6, the leveraged, sequential multiple wire-cutting and seating head 40 includes a main body portion, or punch, 41, having a bore 42 that is sized to receive and be affixed to a lower end of the cylindrical shaft 30, so that axial displacement of the shaft 30 within the axial bore 22 of the end cap 20 will cause axial displacement (along tool axis 12) of the main body portion 41 of the cutting head 40. The cutting head has a lever arm 35, which rotates about a pin 36 that passes through a bore 37 in the main body portion 41. Main body portion 41 has a pair of land portions 43 and 44 on either side of a gap 45 that allows for confined or limited rotational movement of the lever arm 35 therebetween. A plurality of punch slots 46 are formed in the bottom of the main body portion 41.

As shown in detail in FIGS. 7–11, the lever arm 35 has a generally rounded upper end portion 38 that abuts against and slides along cam surface portion 23 of end cap 20, and a lower end portion 39, which engages a slot 141 of a movable cutter 140, that is carried by a stationary cutter 150. The stationary cutter 150, shown in detail in FIGS. 11–17, is attached to the main body portion 41 of the cutting head 40 by screw fasteners through holes 152 and 153. Stationary cutter 150 has a bore 154 which accommodates the fulcrum pin 44 of the lever arm 43, and a generally rectangular transverse slot 155, that is sized to receive the movable cutter 140. Projecting beneath slot 155 are a plurality of cutting and seating heads 156, which cooperate with the blade elements 142 of the movable cutter 140 to seat and sever the wires, as will be described.

Figure 18:
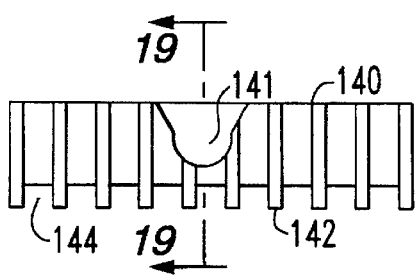
FIG. 18 is a side view of the movable cutter.
Figure 19:
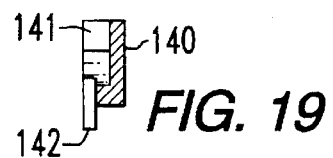
FIG. 19 shows a sectional view of the movable cutter, taken along lines 19—19 in FIG. 18.
Figure 20:
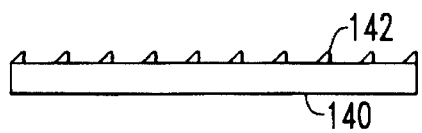
FIG. 20 is a bottom view of the movable cutter.

The movable cutter 140 is shown in detail in FIGS. 18–20 as being generally rectangularly configured to fit within and be translated along transverse slot 155 in stationary cutter 150. Movable cutter 140 has a plurality of wire cutting blade elements 142, which cooperate with the cutting and seating heads 156 of the stationary cutter 150. As pointed out above, and as can be seen from the Figures, translation of the movable cutter 140 is effected by the rotation of the lower end portion 39 of lever arm 35. (As pointed out briefly above, the dimensions of lever arm 35 and the angle of incline of cam surface portion 23 of cap 20 are chosen to provide a prescribed mechanical advantage in the course of translating an impact force imparted along tool axis 16 to the transverse direction. In accordance with a non-limiting parametric example, the dimensions may be chosen to provide a mechanical advantage of 4:1.)

In addition, the separation or spacial periodicity 144 between successively adjacent ones of the movable cutter head blade elements 142 is slightly greater than the spacings between adjacent terminals of a terminal block, so that successively adjacent wires will be effectively engaged in sequence, when the cutting head 140 is translated against the wires by the rotation of lever arm 35. As a non-limiting example, the slightly increased separations 144 between the blade elements 142 relative to the terminal spacings (e.g. a 155 mil spacing 144 between blade elements 142 vs. a 150 mil spacing between terminals) causes an arbitrary blade (blade i) to come in contact with and begin cutting into a respective wire (wire i), just before the next successive blade (blade i+1) comes in contact with and begins cutting into the next successive wire (wire i+1). For the non-limiting parameters of the present example (mechanical advantage ratio of 4:1 and relative spacings set forth above), the spacing differential is such that each of four successive blade elements 142 along the translation direction of the movable cutter 140 will sequentially come into contact with and effect the shearing of four successively adjacent wires, prior to the next four successive blades of the cutting head beginning to shear the next set of four wires engaged thereby, and so on. Namely, the combination of the mechanical advantage and the slightly increased spacings between the blade elements 142 of the cutting head 140 relative to those of the terminals into which the wires are inserted means that the force required to be imparted to the cutting head to completely shear a single wire is effective to sequentially cut through multiple wires, in the course of the blade severing the end of an individual wire.

OPERATION

The operation of the first embodiment of the invention may be readily understood with reference to FIGS. 21–26, which diagrammatically illustrate the relative positions of the components of the impact tool at successive stages of its engaging and sequentially cutting through multiple wires of a terminal block.

Figure 21:
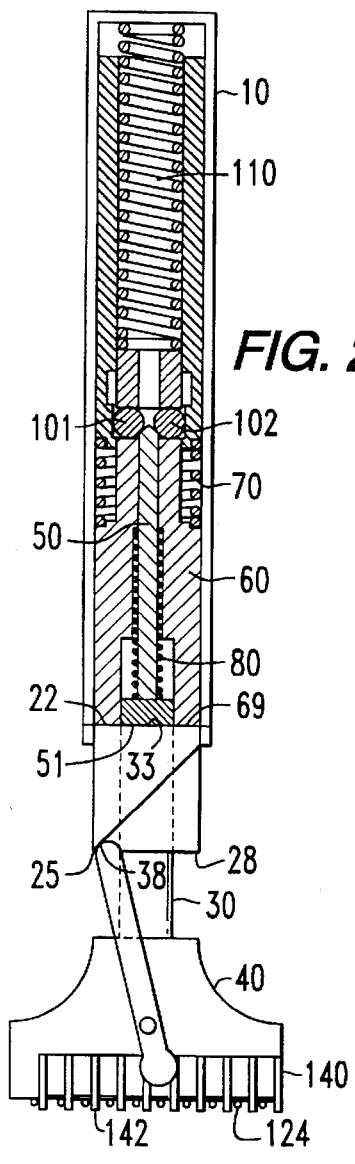
FIGS. 21–26 diagrammatically illustrate relative positions of the components of the first embodiment of the impact tool of the present invention at successive stages of its engaging and cutting multiple wires of a terminal block.

As shown in FIG. 21, immediately prior to initiating the wire seating and cutting operation, the impact tool is positioned so that its cutting head 40 is urged against the wires to be inserted into the terminals of the terminal block, with individual ones of wires being received in the respective spaces between successive blades 142 of the moveable cutter 140. In this 'at rest' state of the tool, the lower end face 69 of hammer 60 is urged against the upper end face 22 of cap 20 by main spring 110. Also the lower end face 51 of the generally cylindrical T-head portion 52 of plunger 50 is urged against the upper generally flat end face 33 of shaft 30 (to which the cutting head 40 is attached) by plunger return spring 80. In this configuration, shaft 30 is fully extended, so that lever arm 42 is rotated (to its full counter-clockwise position, as viewed in FIG. 21), whereby its generally rounded upper end surface portion 38 abuts against the forwardmost end 25 of cap member 20. Also, the ball-collar 90 is separated from hammer 60 by ball-collar return spring 70.

Figure 22:
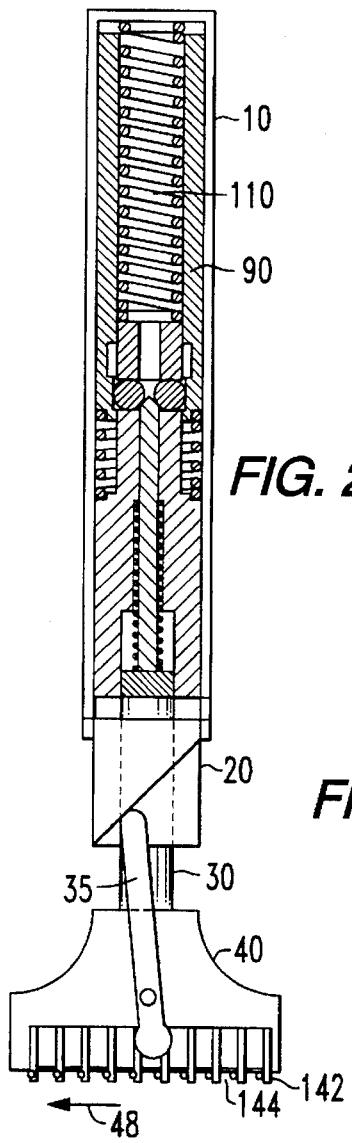

To begin seating and cutting the wires, the craftsperson begins applying an axially downward force on the handle 10, which initiates rotation of lever arm 35 about fulcrum pin 36 (in a clockwise rotational direction, as shown in FIG. 22), so that the upper rounded end 38 of lever arm 35 begins to travel upwardly along cam surface portion 23 of the end cap 20. As lever arm 35 rotates, the effective axial separation between its axis of rotation (pin 36) and the lower end face 28 of cap 20 decreases, so that end cap 20 and the handle body 13 solid therewith begin travelling downwardly around the shaft 30 within the axial bore 27 of end cap 20.

Figure 23:
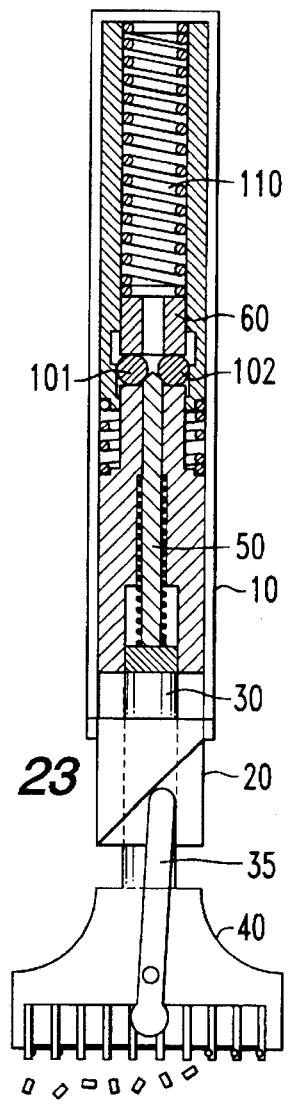

Since (clockwise) rotation of lever arm 35 translates the moveable cutter 140 from right-to-left across the Figures, successive ones of the cutter head blades 142 are translated in a cutting direction 48, generally transverse to the longitudinal axial direction 12 of the handle, so as to sequentially come into contact with and effect the shearing of successively adjacent ones of wires 124. As noted above, the slightly increased separations 144 between the blade elements 142 of the movable cutter 140 relative to the terminal spacings cause each blade 142 to come in contact with and begin cutting into a respective wire 124, just before the next successive blade comes in contact with and begins cutting into its associated next successive wire. As this further clockwise rotation of lever arm 42 continues to translate the cutter 46 from right to left across the Figures, the cutter head blades 47 continue to be translated in the direction 48, so that some of the blades have now cut through and completely severed successively adjacent ones of the wires 124, as shown in FIG. 23.

Figure 24:
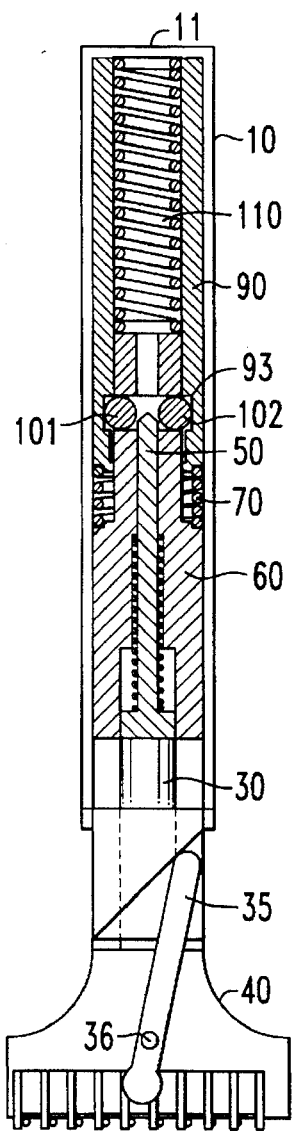

Within the handle 10, since the lower end face 51 of plunger 50 is urged against the upper generally flat end face 33 of shaft 30 by plunger return spring 80, the end cap 20 is urged downwardly away from plunger 50. With the tapered end 54 of plunger shaft 53 being urged against each of steel balls 101 and 102, which are captured in transverse bore 68 of the hammer 60 and link the plunger and the hammer together, the downward force on the handle causes the handle body 13 to move downwardly toward the hammer, decreasing the separation between each of the hammer 60 and ball-collar 90 and the base end 11 of the handle 10, compressing main spring 110. As shown in FIG. 24, as lever arm 35 continues to rotate (clockwise), ball-collar 90 eventually comes into contact with the base end 11 of the handle 10.

As the craftsperson continues applying insertion force along the axis of the tool handle, the separation between base end 11 of handle 10 and hammer 60 continues to decrease, so that there is further compression of main spring 110, causing compression of ball-collar return spring 70. This relative axial movement between hammer 60 and ball-collar 90 begins to bring transverse bore 68 (in which steel balls 101 and 102 are captured) axially closer to the notch/groove 93 in ball-collar 90.

Figure 25:
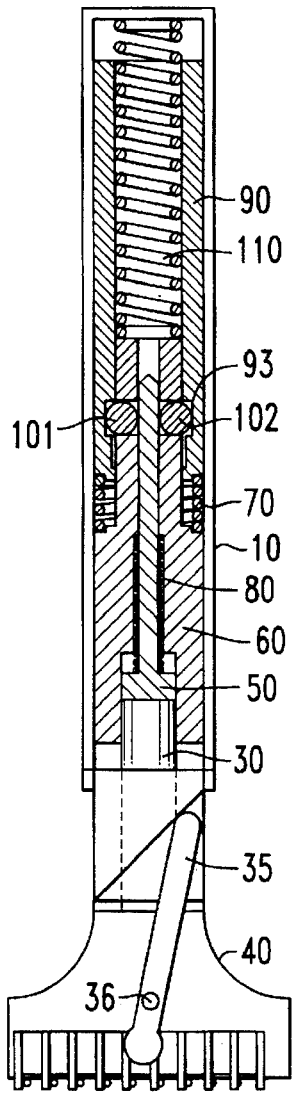

FIG. 25 shows the condition of the tool where there is full compression of the main spring and relative axial movement between hammer 60 and ball-collar 90 has brought transverse bore 68 and its captured steel balls 101 and 102 alongside the annular notch/groove 93 in ball-collar 90. The tapered end 54 of plunger shaft 53 now pushes each of steel balls 101 and 102 into the annular notch/groove 93 in ball-collar 90, thereby decoupling plunger 50 from hammer 60, and allowing the plunger shaft 53 to pass between the two balls. With steel balls 101 and 102 captured in notch 93 of ball-collar 90, they now mechanically link the hammer and the ball-collar 90 together.

Figure 26:
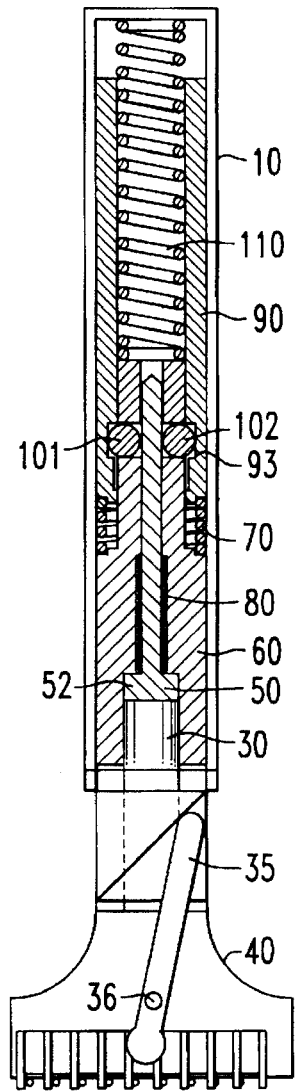

Since the steel balls 101 and 102 are now out of the way of plunger shaft 53, the compressive force stored in main spring 110 is now released against hammer 60, so that hammer 60 and the cylindrical T-head portion 52 of plunger 50 are rapidly propelled toward one another, whereby hammer 60 strikes the T-head portion 52 of plunger 50, as shown in FIG. 26. Thus, unlike, the prior art push-plate mechanisms, the force required to compress the main spring in the impact tool of the present invention also causes translation of the hammer 60 relative to the ball collar 90, so as to bring the balls 101 and 102 within the hammer's transverse bore 68 into eventual alignment with the interior groove 93 in the ball collar 90 at a point in their relative axial travel where the main spring 110 is fully compressed, so that the balls move out of the way of the plunger 50 and allow the hammer 60 to release.

Since the ball-collar 90 is linked by balls 101 and 102 to hammer 60, it moves downwardly in concert with hammer 60, compressing ball-collar return spring 70. In addition plunger return spring 80 is compressed. The impacting force between hammer 60 and plunger 50 is transferred to shaft 30, causing a corresponding final impact-based clockwise rotation of lever arm 35, and a rapid forceful transverse movement of the cutting head blades 142 through remaining ones of the wires, thereby completing the wire severing/seating operation of the tool.

After the hammer 60 strikes the T-head portion 52 of plunger 50, the craftsperson releases the pressure applied to the handle, allowing the restoring force energy stored each of ball-collar return spring 70 and plunger return spring 80 to be released, thereby causing hammer 60 and ball-collar 90 to move toward the base end 11 of handle 10, and lever arm 35 to rotate back (counter-clockwise) toward its original position, as plunger 50 continues to impart a downward force against shaft 30. As ball-collar 90 travels upwardly past plunger shaft 53, the lower annular edge of the notch/groove 93 in ball-collar 90 pushes against steel balls 101 and 102, urging them toward one another.

Eventually, relative axial movement between hammer 60 and plunger 50 brings the tapered end 54 of plunger shaft 53 past transverse bore 68, and gain brings notch 93 of ball-collar 90 alongside transverse bore 68, whereupon steel balls 101 and 102 enter bore 68 and are again captured by hammer 60. Plunger 50 and hammer 60 continue to move past one another until the tool components have returned to their original positions shown in FIG. 21, with the lower end face 69 of hammer 60 still urged against the upper end face 22 of cap 20 by main spring 110, and the lower end face 51 of the generally cylindrical T-head portion 52 of plunger 50 urged against the upper generally flat end face 33 of shaft 30 by plunger return spring 80. The cutting head shaft 30 is now once again fully extended, with cutting head lever arm 35 rotated (counter-clockwise) back to its original position, having its generally rounded upper end surface portion 38 abutting against the forwardmost end 25 of the cam surface 23 of end cap 20.

In accordance with the first embodiment of the invention, described above, the main spring 110 passes through axial bore 92 of ball-collar 90 and abuts against the hammer's second body portion 63. Pursuant to a second embodiment of the invention, the tool components are modified such that the main spring extends the entire length of the handle bore, surrounding both the hammer and the ball-collar.

Figure 9:
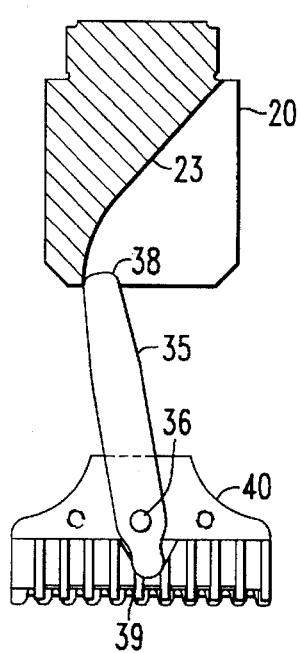
FIGS. 9 and 10 show respectively different translational positions of a movable cutter, for respectively different rotational positions of the lever arm.
Figure 10:
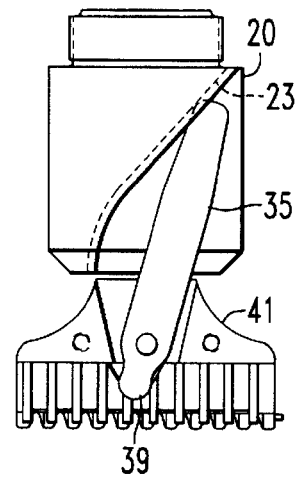
Figure 12:
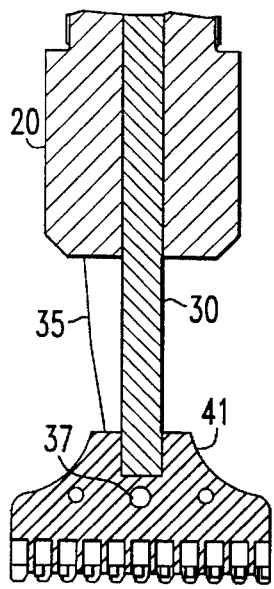
FIG. 12 is a diagrammatic front sectional view of the cutting head, axial shaft, lever arm and end cap.
Figure 11:
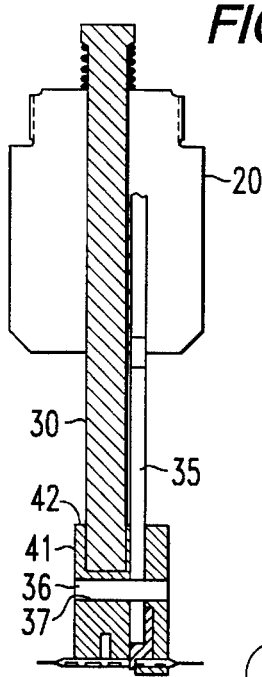
FIG. 11 is a diagrammatic side, partial sectional view of the cutting head, axial shaft, lever arm and end cap.
Figure 13:
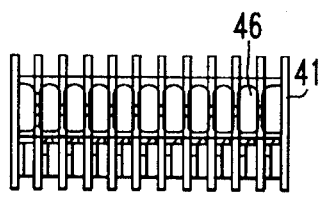
FIG. 13 is a bottom view of the cutting head.
Figure 14:
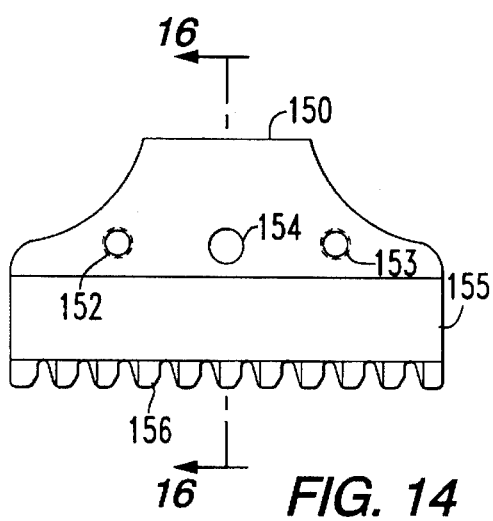
FIG. 14 shows a front side view of the stationary cutter.
Figure 15:
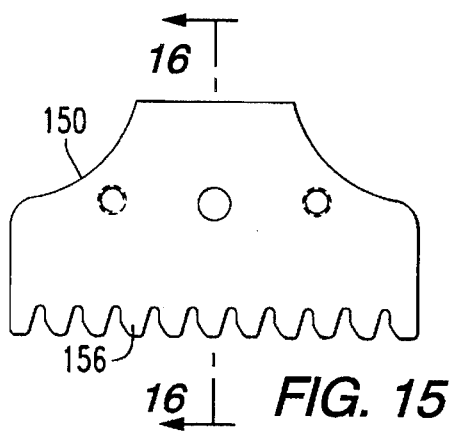
FIG. 15 shows a rear side view of the stationary cutter.
Figure 16:
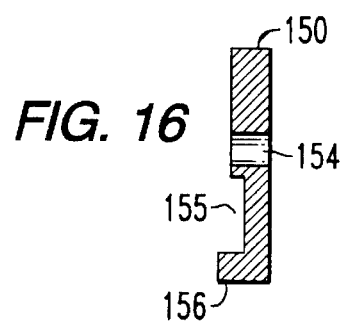
FIG. 16 shows a sectional view of the stationary cutter, taken along lines 16—16 in FIG. 14.
Figure 17:
FIG. 17 is a bottom view of the stationary cutter.

More particularly, referring to FIGS. 27–32, a second embodiment of the impact tool according to the present invention is diagrammatically illustrated as comprising a generally cylindrically configured tubular handle or tube 210, shown in detail in FIG. 29, having an upper end 211, that is closed by a base cap 212 which may be threaded into the tube, and a lower end 215, to which an end tube cap 220 is affixed. The end tube cap 220 is preferably configured as shown in FIG. 9–11, described above, having an upper end face and a cam surface portion 23 which extends from a first end of the end cap and terminates at cylindrical sidewall region adjacent to the lower end 215 of tube 210. As shown in the assembly drawing of FIG. 27, end cap 220 has an axial bore 227, which is coaxial with a longitudinal axis 216 of tubular handle 210, and is sized to receive and accommodate axial translation of a cylindrical shaft 230, to a lower end 231 of which the cutting head 40 is mounted. Cylindrical shaft 230 has an upper, T-shape end portion 231 having generally flat end face 233, which is sized to be engaged by a lower end face 251 of a generally cylindrical T-head portion 252 of a plunger 250, shown in detail in FIG. 30. A shaft return spring 239 is captured on shaft 230 between end portion 231 and the upper end face 222 of the end cap 220. Extending from the cylindrical T-head portion 252 of plunger 250 is a cylindrical plunger shaft 253, which passes through a generally cylindrical bore 261 of a hammer 260, shown in detail in FIG. 31, and terminates at a tapered end portion 254. A plunger return spring 280 surrounds plunger shaft 253 between the T-head portion 252 of the plunger 250 and the interior end of a bore region 262 of hammer bore 261.

As shown in detail in FIG. 31, hammer 260 itself comprises a generally cylindrically configured hollow body, having an annular lip portion 263 from which extends a first hammer body portion 264. The outer diameter of first hammer body portion 264 is less than that of the interior diameter of tube 210, so that hammer 260 is axially translatable within tube 210 and accommodate a main spring 310, that surrounds hammer 260 and is confined between the upper end 211 of tube 210 and annular lip portion 263 of hammer 260. The first hammer body portion 264 extends a first length 264L from annular lip portion 263 to a second hammer body portion 265, which has a second length 265L and a smaller outer diameter than the first hammer body portion 264. The smaller outer diameter of second hammer body portion 265 is sized to accommodates a surrounding ball collar-return, compression spring 270 and a generally cylindrical ball-collar 290.

Within the first hammer body portion 264, a first bore region 266 has a diameter slightly greater than the outer diameter of generally cylindrical T-head portion 252 of plunger 250, so that plunger 250 may axially translate within first bore region 266. Extending from first hammer bore region 266 is second hammer bore region 262, sized to accommodate the plunger return spring 280, as described above. Second hammer bore region 262 communicates with a third hammer bore region 264 within second hammer body portion 265. The diameter of the third bore region 264 in the hammer's second body portion 265 is smaller than that of the second hammer bore region 262, so that the return spring 280 is confined between the interior end 268 of the second bore region 262 and an interior face 255 of the generally cylindrical T-head portion 252 of plunger 250.

The second hammer body portion 265 further includes a transverse bore 267, which is sized to receive and retain therein a pair of steel balls 301 and 302. When steel balls 301 and 302 are captured in transverse bore 267, there is sufficient space between them to accommodate a generally circular-grooved portion 258 of plunger shaft 253, such that the grooved portion 258 of the plunger shaft 253 is urged against each of the steel balls to retain them in the transverse bore 267 of hammer 260.

As pointed out above, the second hammer body portion 265 is sized to receive and pass into the axial bore 291 of a generally tubular ball-collar 290. Like hammer 260, ball-collar 290 has an outer diameter that is less than that of the interior diameter of tube 210, so as to allow ball-collar 290 to fit within main spring 310, which is confined between the annular lip portion 263 of hammer 260 and tube base cap 212. The interior diameter of ball-collar 290 is increased over a tapered annular region forming a notch or groove 293, which is axially displaced from the ball-collar's lower end 294, and is sized to accommodate the entry and capture therein of each of steel balls 301 and 302, in the course of relative axial displacement between hammer 260 and ball-collar 290.

The leveraged, sequential multiple wire-cutting and seating head 40 is the same as that of the first embodiment, with the main body 41 thereof mounted to a lower end of the cylindrical shaft 230, so that axial displacement of the shaft 230 within the axial bore 227 of the end cap 220 will cause axial displacement of the main body portion 41 of the cutting head 40 relative to the end cap 220, and thereby rotation of the lever arm 35, so that the impacting force between the hammer 260 and the plunger 250 is transferred to the axial shaft 230 to which the cutting head 40 is affixed, causing a corresponding rapid impact-based rotation of the lever arm 35, and an immediate forceful transverse movement of the cutting head blade elements 142 through the wires, thereby completing the multiple wire severing/seating operation of the impact tool.

OPERATION

Except for the changes in configuration of some of the components of the impact tool, described above, the operation of the second embodiment of the invention is substantially the same as that of the first embodiment and is believed to be self-evident, given the foregoing description of the modified configuration of the second embodiment and the detailed description of the operation of the first embodiment. As in the first embodiment, immediately prior to initiating the wire seating and cutting operation, the impact tool of the second embodiment is positioned, so that the cutting head 40 is urged against the wires to be inserted into the terminals of the terminal block, with individual ones of the wires being received in the respective spaces between successive blade elements 142.

In this initial state of the tool, the lower annular lip 263 of hammer 260 is urged against the upper end face 222 of the end cap 220 by the main spring 310. Also, the lower end face 251 of the generally cylindrical T-head portion 252 of plunger 250 is urged against the upper generally flat end face 233 of shaft 230 by plunger return spring 280. In this configuration, the axially translatable shaft 230 is fully extended, so that lever arm 35 is rotated to its full counter-clockwise position, shown in FIG. 9, whereby its generally rounded upper end surface portion 38 abuts against the forwardmost end of the end cap 220. Also, the ball-collar 290 is separated from the hammer 260 by ball-collar return spring 270.

Again, to begin seating and cutting the wires, the craftsperson applies an axially downward force on the tubular handle 210, which begins to compress main spring 310 and initiates (clockwise) rotation of lever arm 35 about pin 36, so that the upper rounded end 38 of lever arm 35 begins to travel upwardly along cam surface portion 23 of the end cap 220. As the lever arm 35 rotates clockwise, the effective axial separation between its axis of rotation (pin 36) and the lower end face 228 of cap 220 decreases, so that there is relative axial translation between shaft 230 and the axial bore 227 through end cap 220. Clockwise rotation of lever arm 35 translates the movable cutter 140 transversely to axis 216, along stationary cutter 150, so that successive cutter blade elements 142 are translated and sequentially come into contact with and effect the shearing of successively adjacent wires. Within the tubular handle 210, since the lower end face 251 of the plunger 250 is urged against the upper generally flat end face 233 of shaft 230 by plunger return spring 280, plunger 250 is also translated away from end cap 220.

Since the steel balls 301 and 302 are captured in transverse bore 267 of the hammer 260 and, via groove 258 retain the plunger 250 with the hammer 260, movement of plunger 230 causes hammer 260 to move toward the base end 211 of handle 210, further compressing the main spring 310. This displacement of hammer 260 also causes travel of ball-collar 290 which rides on ball-collar return spring atop the hammer 260. As downward force is applied to the handle, lever arm 35 continues to rotate (clockwise), so that the movable cutter 140 translates the cutter head blades 142, whereby some of the blades begin to cut through and completely sever successively adjacent ones of the wires.

Eventually, movement of the base end 211 of the tube 210 toward the hammer 260 and continued compression of main spring 310 causes ball-collar 290 to contact the base end 211 of the handle 210. Further rotation of lever arm 25 and travel of shaft 230 causes compression of ball-collar return spring 270 and relative axial movement between hammer 260 and ball-collar 290. This relative axial movement between hammer 260 and ball-collar 290 causes transverse bore 267 and the steel balls 310 and 302 its contains to travel along tapered groove 293 in ball-collar 290, until the circular groove 258 in the plunger 250 containing the steel balls 301 and 302 is aligned with the annular groove/notch 293 in ball-collar 290. At this point, the steel balls are allowed to enter the annular notch 293, so that they become sufficiently separated from each other to permit plunger shaft 253 to pass between the two balls.

Since the steel balls 301 and 302 are now out of the way of plunger shaft 253, the compressive force stored in main spring 310 is released against hammer 260, and hammer 260 and the cylindrical T-head portion 252 of plunger 250 are rapidly propelled toward one another, causing hammer 260 to strike the T-head portion 252 of plunger 250. The impacting force between hammer 260 and plunger 250 is transferred to shaft 230, causing a corresponding final impact-based clockwise rotation of lever 35, and a rapid forceful transverse movement of the cutting head blade elements 142 through the remaining ones of the wires, thereby completing the wire severing/seating operation of the tool.

After hammer 260 strikes the T-head portion 252 of plunger 250, the craftsperson releases the axial pressure applied to the tool handle, allowing the restoring force energy stored each of ball-collar return spring 270 and plunger return spring 280 to be released, thereby causing hammer 260, plunger 250 and ball-collar 290 to return to their original positions. As the ball-collar 290 travels past hammer 260, the steel balls 301 and 302 are returned to and captured in circular groove 258. The cutting head shaft 230 is now once again fully extended, with cutting head lever arm 35 having been rotated counter-clockwise back to its original position, having its generally rounded upper end surface portion 244 abutting against the forwardmost end 225 of end cap 220.

Thus, although the second embodiment of the present invention locates the ball collar inside the main spring, rather than outside the main spring as in the first embodiment, the interior bore of the ball collar is again provided with an annular groove that is located to receive the plunger-hammer retention balls, as the transverse bore in the hammer becomes aligned with the ball collar groove at the desired point of main spring compression. There is no need for the craftsperson to push the handle with more force than is required to compress the main spring. As in the first embodiment, the force required to compress the main spring by pushing down on the handle is also effective to cause translation of the hammer relative to the ball collar, so as to bring the balls within the hammer's transverse bore into eventual alignment with the interior groove in the ball collar at a point in their relative axial travel where the mainspring is fully compressed, whereby the balls move out of the way of the plunger and allow the hammer to release.

As will be appreciated from the foregoing description, the present invention provides an impact tool that is designed to seat and cut a plurality of wires in a telephone wire termination block, without requiring the application of an extraordinary amount of force by the craftsperson. Because the spacial periodicity among the shear and guide regions of the cutting head differs slightly from that of the terminals of the terminal block, then, as the multiple wire cutting head is translated against the wires, its shear elements do not engage each wire at the same time. Instead, the wires are engaged in a cascaded sequence, with the cutting force being applied to multiple wires at the same time. Since the tool leverages the translatable cutting head to provide a mechanical advantage, the input force required to cut plural wires is reduced to only that required to cut a single wire.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. An impact tool for use with a utility device, comprising a generally hollow handle having a first end that is provided with an axial bore therethrough sized to accommodate the translation of a shaft element along a longitudinal axis of said handle, said shaft element having a first, head portion which is engaged by a moveable plunger that is disposed within said handle and is translatable along a longitudinal axis of said handle, and a second, end portion to which said utility device is mounted, said plunger passing through a bore of hammer, that is axially translatable within said handle, said hammer having a transverse bore which is sized to receive a plurality of balls, such that said balls are urged against and retain said plunger with said hammer, a main spring supported within said handle and urging said hammer axially toward said shaft element, said hammer passing through a ball-collar, which is axially translatable within said handle, said ball collar having an interior groove that is sized to receive said balls when said transverse bore of said hammer is axially translated adjacent to said interior groove of said ball collar, thereby removing retention between said hammer and said plunger provided by said balls and allowing said plunger to pass through said bore of said hammer, so that said hammer may be rapidly axially translated by said main spring to strike said head portion of said moveable plunger and thereby impart a striking force to said shaft element, which is coupled to said utility device mounted to said second, end portion of said shaft element.

2. An impact tool according to claim 1, wherein said utility device comprises a wire cutting device.

3. An impact tool according to claim 1, wherein said utility device comprises a wire cutting device for cutting and seating at least one wire for installation in a wire termination block.

4. An impact tool according to claim 2, wherein said first closed end of said handle comprises an end cap having said axial bore therethrough, said axial bore being sized to accommodate the translation of said shaft element along said longitudinal axis of said handle, and wherein said wire cutting device includes a cutting head, that is mounted to said second portion of said shaft element, and a movable cutter, mounted for translation relative to said cutting head in a direction that is generally transverse to said longitudinal axis of said handle, and a force translation mechanism coupled between said handle and said movable cutter and being operative to translate an impact force imparted along said longitudinal axis of said handle to said movable cutter.

5. An impact tool according to claim 4, wherein end cap has a cam surface portion, and said force translation device comprises a lever arm, having a first portion thereof engaging said cam surface of said end cap and a second portion thereof engaging said movable cutter, so as to cause translation of said movable cutter along said transverse direction as said shaft element is axially translated relative to said end cap.

6. An impact tool according to claim 4, wherein said wire cutting device comprises a multiple wire cutting head and a movable cutter having a plurality of wire shear and guide elements, that are configured to be placed against the wire-receiving terminals of a wire terminal block, said cutting head being mounted to said shaft element, and a force translation mechanism coupled between said handle and said movable cutter and being operative to translate an impact force imparted along said longitudinal axis of said handle to said movable cutter.

7. An impact tool according to claim 6, wherein said shear and guide elements of said movable cutter are spaced apart from one another by respective separations that differ slightly from those between adjacent terminals of a wire terminal block, so that, as said movable cutter is translated against wires to be cut and installed in said wire terminal block, said shear elements engage said wires in rapid sequence, such that the cutting force of the tool effectively operates to cut through a plurality of wires during a single impact stroke.

8. An impact tool according to claim 7, wherein end cap has a cam surface portion, and said force translation device comprises a lever arm, having a first portion thereof engaging said cam surface of said end cap and a second portion thereof engaging said movable cutter, so as to cause translation of said movable cutter along said transverse direction as said shaft element is axially translated relative to said end cap.

9. An impact tool according to claim 8, wherein said multiple wire-cutting head includes a main body portion mounted to said shaft element, such that axial displacement of said shaft element within said axial bore of said end cap causes axial displacement of said main body portion of said cutting head relative to said end cap, said lever arm being mounted for rotation about a pin attached to said main body portion, and having said first portion thereof travelling along said cam surface of said end cap and said second portion thereof translating said movable cutter as said shaft element is axially translated relative to said end cap.

10. An impact tool according to claim 9, wherein dimensions of said lever arm and angle of incline of said cam surface of said end cap are defined so as to provide a mechanical advantage in the course of translating insertion force applied to said handle to said movable cutter.

11. An impact tool according to claim 1, wherein said axially translatable shaft element has a generally flat end face which is sized to be engaged by a lower end face of said head portion of said moveable plunger, and wherein said plunger has a longitudinal rod portion extending from its head portion and passes through said axial bore of said hammer and terminates at a tapered end portion thereof.

12. An impact tool according to claim 11, wherein said hammer has a first body portion that extends a first length from a lower end face thereof to a second body portion having a second length and a smaller outer diameter than said first body portion, the smaller outer diameter of said second body portion of said hammer providing a surrounding annular region, that accommodates a ball collar-return spring, and wherein, within said first body portion of the hammer, the bore of said hammer has a diameter that accommodates said head portion of said plunger, so that said plunger may axially translate therein.

13. An impact tool according to claim 12, wherein said second portion of said bore of said hammer has a plunger-return spring surrounding said longitudinal rod portion, and wherein said second bore portion of said hammer has a third bore portion of a reduced diameter, which confines said plunger compression spring between an interior end of said second bore portion and an interior face of said head portion of said plunger.

14. An impact tool according to claim 11, wherein said utility device comprises a wire cutting device.

15. An impact tool according to claim 11, wherein said utility device comprises a wire cutting device for cutting and seating at least one wire for installation in a wire termination block.

16. An impact tool according to claim 14, wherein said first closed end of said handle comprises an end cap having said axial bore therethrough, said axial bore being sized to accommodate the translation of said shaft element along said longitudinal axis of said handle, and wherein said wire cutting device includes a cutting head, that is mounted to said second portion of said shaft element, and a movable cutter, mounted for translation relative to said cutting head in a direction that is generally transverse to said longitudinal axis of said handle, and a force translation mechanism coupled between said handle and said movable cutter and being operative to translate an impact force imparted along said longitudinal axis of said handle to said movable cutter.

17. An impact tool according to claim 16, wherein end cap has a cam surface portion, and said force translation device comprises a lever arm, having a first portion thereof engaging said cam surface of said end cap and a second portion thereof engaging said movable cutter, so as to cause translation of said movable cutter along said transverse direction as said shaft element is axially translated relative to said end cap.

18. An impact tool according to claim 16, wherein said wire cutting device comprises a multiple wire cutting head and a movable cutter having a plurality of wire shear and guide elements, that are configured to be placed against the wire-receiving terminals of a wire terminal block, said cutting head being mounted to said shaft element, and a force translation mechanism coupled between said handle and said movable cutter and being operative to translate an impact force imparted along said longitudinal axis of said handle to said movable cutter.

19. An impact tool according to claim 18, wherein said shear and guide elements of said movable cutter are spaced apart from one another by respective separations that differ slightly from those between adjacent terminals of the terminal block, so that, as said movable cutter is translated against wires to be cut, its shear elements engage said wires in rapid sequence, such that the cutting force of the tool effectively operates to cut through a plurality of wires during a single impact stroke.

20. An impact tool according to claim 19, wherein said multiple wire-cutting head includes a main body portion mounted to said shaft element, such that axial displacement of said shaft element within said axial bore of said end cap causes axial displacement of said main body portion of said cutting head relative to said end cap, said lever arm being mounted for rotation about a pin attached to said main body portion, and having said first portion thereof travelling along said cam surface of said end cap and said second portion thereof translating said movable cutter as said shaft element is axially translated relative to said end cap.

21. An impact tool according to claim 20, wherein said movable cutter has a plurality of wire cutting blades, and is supported by said main body portion of said cutting head for translation in a direction transverse to said longitudinal axis of said handle, so that rotation of said lever arm effects transverse translation of blades of said movable cutter.

22. An impact tool according to claim 1, wherein said main spring is disposed within a bore in said ball-collar.

23. An impact tool according to claim 22, wherein said main spring is confined between an end of said handle and an end of said hammer.

24. An impact tool according to claim 1, wherein said main spring surrounds said hammer and said ball-collar.

25. An impact tool according to claim 24, wherein an end portion of said hammer has an annular lip portion, and wherein said main spring is confined between one end of said handle and said annular lip portion of said hammer.

26. An impact tool according to claim 25, wherein said hammer has a first hammer body portion that extends a first length from said annular lip portion to a second hammer body portion, which has a second length and a smaller outer diameter than said first hammer body portion, said smaller outer diameter of the second hammer body portion accommodating a surrounding ball collar-return, compression spring and said cylindrical ball-collar.

27. An impact tool according to claim 26, wherein said first hammer body portion has a first bore region of a diameter slightly larger than the outer diameter of a generally cylindrical T-head portion of said plunger, so that said plunger may axially translate within said first bore region of said hammer, and wherein a second hammer bore region extends from said first hammer bore region and contains a plunger return spring.

28. An impact tool according to claim 27, wherein said second hammer body portion includes said transverse bore, and wherein said plunger has a generally circular groove sized to accommodate said balls when said balls are captured in said transverse bore in said hammer, and wherein the interior diameter of said ball-collar is increased over a tapered annular region, which is axially displaced from an end of said ball collar and is sized to accommodate the entry and capture of said balls during relative axial displacement between said hammer and said ball collar, so as to allow said hammer to rapidly move past said plunger.

29. A force release mechanism for an impact tool, said impact tool having a generally hollow handle, a first end of which is provided with an axial bore sized to accommodate translation along a longitudinal axis of said handle of a shaft element of said handle, said shaft element having a utility device mounted thereto, said force release mechanism comprising a moveable plunger configured to be disposed within and translatable along said longitudinal axis of said handle, said plunger engaging said shaft element and passing through a bore of a hammer, that is axially translatable within said handle, said hammer having a transverse bore which is sized to receive at plurality of balls, such that said balls are urged against and retain said plunger with said hammer, a main spring supported within said handle and urging said hammer axially toward said shaft element, said hammer passing through a ball-collar, which is axially translatable within said handle, said ball collar having an interior groove that is sized to receive said balls when said transverse bore of said hammer is axially translated adjacent to said interior groove of said ball collar, thereby removing retention between said hammer and said plunger provided by said balls and allowing said plunger to pass through said bore of said hammer, so that said hammer may be rapidly axially translated by said main spring to strike said head portion of said moveable plunger and impart a striking force to said shaft element, and thereby to said utility device mounted thereto.

30. A force release mechanism according to claim 29, wherein said first end of said handle includes an end cap having said axial bore therethrough, said axial bore being sized to accommodate the translation of said shaft element along said longitudinal axis of said handle, and wherein said utility device includes a main body portion mounted to said shaft element, and a movable body portion mounted for translation relative to said main body portion in a direction that is generally transverse to said longitudinal axis of said handle, and a force translation mechanism coupled between said cap and said movable body portion and being operative to translate an impact force imparted along said longitudinal axis of said handle to said movable body portion.

31. A force release mechanism according to claim 30, wherein end cap has a cam surface portion, and said force translation device comprises a lever arm, having a first portion thereof engaging said cam surface of said end cap and a second portion thereof engaging said movable body portion, so as to cause translation of said movable body portion along said transverse direction as said shaft element is axially translated relative to said end cap.

32. A force release mechanism according to claim 31, wherein dimensions of said lever arm and angle of incline of said cam surface of said end cap are defined so as to provide a mechanical advantage in the course of translating force applied to said handle to said movable body portion of said utility device.

33. A force release mechanism according to claim 29, wherein said axially translatable shaft element has a generally flat end face which is sized to be engaged by a lower end face of said head portion of said moveable plunger, and wherein said plunger has a longitudinal rod portion extending from its head portion and passes through said axial bore of said hammer and terminates at a tapered end portion thereof.

34. A force release mechanism according to claim 33, wherein said hammer has a first body portion that extends a first length from a lower end face thereof to a second body portion having a second length and a smaller outer diameter than said first body portion, the smaller outer diameter of said second body portion of said hammer providing a surrounding annular region, that accommodates a ball collar-return spring, and wherein, within said first body portion of the hammer, the bore of said hammer has a diameter that accommodates said head portion of said plunger, so that said plunger may axially translate therein.

35. A force release mechanism according to claim 34, wherein said second portion of said bore of said hammer has a plunger-return spring surrounding said longitudinal rod portion, and wherein said second bore portion of said hammer has a third bore portion of a reduced diameter, which confines said plunger compression spring between an interior end of said second bore portion and an interior face of said head portion of said plunger.

36. A force release mechanism according to claim 29, wherein said main spring is disposed within a bore in said ball-collar.

37. A force release mechanism according to claim 36, wherein said main spring is confined between an end of said handle and an end of said hammer.

38. A force release mechanism according to claim 29, wherein said main spring surrounds said hammer and said ball-collar.

39. A force release mechanism according to claim 38, wherein an end portion of said hammer has an annular lip portion, and wherein said main spring is confined between one end of said handle and said annular lip portion of said hammer.

40. A force release mechanism according to claim 39, wherein said hammer has a first hammer body portion that extends a first length from said annular lip portion to a second hammer body portion, which has a second length and a smaller outer diameter than said first hammer body portion, said smaller outer diameter of the second hammer body portion accommodating a surrounding ball collar-return, compression spring and said cylindrical ball-collar.

41. A force release mechanism according to claim 40, wherein said first hammer body portion has a first bore region of a diameter slightly larger than the outer diameter of a generally cylindrical T-head portion of said plunger, so that said plunger may axially translate within said first bore region of said hammer, and wherein a second hammer bore region extends from said first hammer bore region and contains a plunger return spring.

42. A force release mechanism according to claim 41, wherein said second hammer body portion includes said transverse bore, and wherein said plunger has a generally circular groove sized to accommodate said balls when said balls are captured in said transverse bore in said hammer, and wherein the interior diameter of said ball-collar is increased over a tapered annular region, which is axially displaced from an end of said ball collar and is sized to accommodate the entry and capture of said balls during relative axial displacement between said hammer and said ball collar, so as to allow said hammer to rapidly move past said plunger.

43. A wire cutting device for use with a force impact tool, said impact tool having a handle containing a force release mechanism, which is operative to impart an impact force to a shaft element that is translatable through an axial bore of one end of said handle along a longitudinal axis of said handle, said wire cutting device having a cutting head, that is mounted to said shaft element, and a movable cutter, mounted for linear translation relative to said cutting head in a direction that is generally transverse to said longitudinal axis of said handle, and a force translation mechanism coupled between said handle and said movable cutter and being operative to translate an impact force imparted along said longitudinal axis of said handle to said movable cutter.

44. A wire cutting head according to claim 43, wherein said handle includes an end cap at said one end thereof, said end cap having a cam surface portion, and wherein said force translation device comprises a lever arm, having a first portion thereof engaging said cam surface of said end cap and a second portion thereof engaging said movable cutter, so as to cause linear translation of said movable cutter along said transverse direction as said shaft element is axially translated relative to said end cap.

45. A wire cutting head for use with a force impact tool, said impact tool having a handle containing a force release mechanism, which is operative to impart an impact force to a shaft element that is translatable through an axial bore of one end of said handle along a longitudinal axis of said handle, said wire cutting device having a cutting head, that is mounted to said shaft element, and a movable cutter, mounted for linear translation relative to said cutting head in a direction that is generally transverse to said longitudinal axis of said handle, and a force translation mechanism coupled between said handle and said movable cutter and being operative to translate an impact force imparted along said longitudinal axis of said handle to said movable cutter, wherein said movable cutter has a plurality of wire shear and guide elements, that are configured to be placed against wire-receiving terminals of a wire terminal block.

46. A wire cutting head according to claim 45, wherein said shear and guide elements of said movable cutter are spaced apart from one another by respective separations that differ slightly from those between adjacent terminals of said wire terminal block, so that, as said movable cutter is translated against wires to be cut and installed in said wire terminal block, said shear elements engage said wires in rapid sequence, such that the cutting force of the tool effectively operates to cut through a plurality of wires during a single impact stroke.

47. A wire cutting head according to claim 46, wherein said handle includes an end cap at said one end thereof, said end cap having a cam surface portion, and wherein said force translation device comprises a lever arm, having a first portion thereof engaging said cam surface of said end cap and a second portion thereof engaging said movable cutter, so as to cause translation of said movable cutter along said transverse direction as said shaft element is axially translated relative to said end cap.

48. A wire cutting head according to claim 47, wherein dimensions of said lever arm and angle of incline of said cam surface of said end cap are defined so as to provide a mechanical advantage in the course of translating insertion force applied to said handle to said movable cutter.

49. A wire cutting and seating device, comprising a force impact tool, said impact tool having a handle containing a force release mechanism, which is operative to impart an impact force to a shaft element that is translatable through an axial bore at one end of said handle along a longitudinal axis of said handle, a wire cutting head mounted to said shaft element, a movable cutter, mounted for linear translation relative to said wire cutting head in a direction that is generally transverse to said longitudinal axis of said handle, and a force translation mechanism coupled between said handle and said movable cutter and being operative to translate an impact force imparted along said longitudinal axis of said handle to said movable cutter.

50. A wire cutting and seating device according to claim 49, wherein said wire cutting device comprises a multiple wire cutting head, and wherein said movable cutter has a plurality of wire shear and guide elements, that are configured to be placed against wire-receiving terminals of a wire terminal block, and wherein said wire shear and elements of said movable cutter are spaced apart from one another by respective separations that differ slightly from those between adjacent terminals of said wire terminal block, so that, as said movable cutter is translated against wires to be cut and installed in said wire terminal block, said shear elements engage said wires in rapid sequence, such that the cutting force of said wire cutting device cuts through a plurality of wires during a single impact stroke imparted by said force release mechanism.

51. A wire cutting and seating device according to claim 49, wherein said shaft element has a first, head portion which is engaged by a moveable plunger that is disposed within said handle and is translatable along a longitudinal axis of said handle, and a second, end portion to which said utility device is mounted, said plunger passing through a bore of hammer, that is axially translatable within said handle, said hammer having a transverse bore which is sized to receive at plurality of balls, such that said balls are urged against and retain said plunger with said hammer, a main spring supported within said handle and urging said hammer axially toward said shaft element, said hammer passing through a ball-collar, which is axially translatable within said handle, said ball collar having an interior groove that is sized to receive said balls when said transverse bore of said hammer is axially translated adjacent to said interior groove of said ball collar, thereby removing retention between said hammer and said plunger provided by said balls and allowing said plunger to pass through said bore of said hammer, so that said hammer may be rapidly axially translated by said main spring to strike said head portion of said moveable plunger and impart a striking force to said shaft element, and thereby to the movable cutter of said multiple wire cutting head.

52. A wire cutting and seating device according to claim 51, wherein said first closed end of said handle comprises an end cap having said axial bore therethrough, said end cap having a cam surface portion, and wherein said force translation device comprises a lever arm, having a first portion thereof engaging said cam surface of said end cap and a second portion thereof engaging said movable cutter, so as to cause linear translation of said movable cutter along said transverse direction as said shaft element is axially translated relative to said end cap.

53. A wire cutting and seating device according to claim 50, wherein dimensions of said lever arm and angle of incline of said cam surface of said end cap are defined so as to provide a mechanical advantage in the course of translating insertion force applied to said handle to said movable cutter.

* * * * *